Nov. 10, 1936.  C. A. TEA  2,060,353
WEATHER STRIP
Filed March 27, 1936
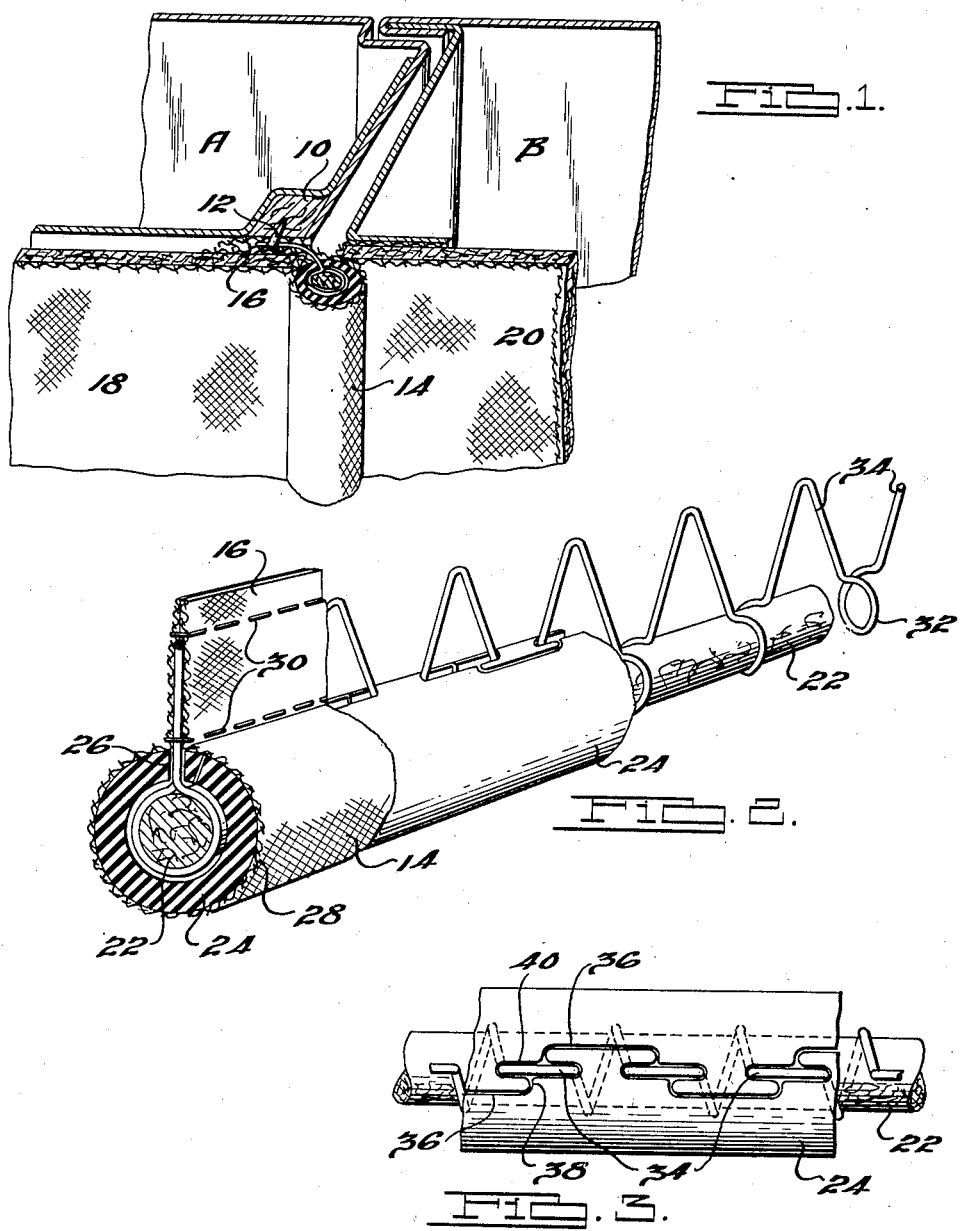
INVENTOR.
Clark A. Tea.
BY
Harness, Lind, Patee + Harris
ATTORNEYS.

Patented Nov. 10, 1936

2,060,353

UNITED STATES PATENT OFFICE 2,060,353

WEATHER STRIP

Clark A. Tea, Detroit, Mich., assignor to Chrysler Corporation, Highland Park, Mich., a corporation of Delaware Application March 27, 1936, Serial No. 71,124

2 Claims. (Cl. 20—69)

This invention relates to a weatherstrip and more particularly to a weatherstrip especially adapted for use on motor vehicle bodies to seal the opening around the doors or windows.

An object of the invention is to provide a weatherstrip which is strong, inherently resilient, and inexpensive to manufacture.

Another object of the invention is to provide a weatherstrip, the parts of which are easily assembled and retained in assembled position, preferably by stitching.

A further object of the invention is to provide a weatherstrip which is free to bend laterally in applying the same to a curved opening.

A further object of the invention is to provide a weatherstrip which has sufficient resiliency to cause it to tightly engage the door or window for sealing purposes and yet adapted to take a permanent set when bent beyond its elastic limit, so that in applying the weatherstrip to an opening it may be bent beyond its elastic limit to conform to any irregularities around the opening and after being bent to that position possesses sufficient resiliency to flex within given limits.

More specifically stated, the invention consists in applying a resilient wire to the central portion of a cushioning part of the weatherstrip, extending the wire into an attaching portion so that the parts are connected together in such a manner that relative bending movement is resiliently resisted and to form an interlocking connection between the wire and the cushioning part.

Other objects and advantages of the invention will be more fully understood from the following description taken in connection with the accompanying drawing, in which:

Fig. 1 is a perspective view, parts being broken away and in section, of one application of the device as applied to an automobile door opening.

Fig. 2 is a perspective view of the weatherstrip alone, parts thereof being broken away and in section.

Fig. 3 is a fragmentary view showing in elevation the tortuous slot through the resilient member for interlocking the wire and the resilient member.

Referring to the drawing, I have illustrated a portion of an automobile body frame at A and a door at B. The frame is provided with a tacking insert 10 to which the weatherstrip is secured such as by tacks 12.

The weatherstrip comprises a cushioning member 14 and an attached flanged tacking strip 16, the latter being secured to the tacking insert 10. As illustrated, the panel member 18 is secured to the frame A overlapping the flanged tacking strip 16. The inner panel of the door is shown at 20.

Referring now to Fig. 2 the weatherstrip is provided with a core 22, preferably in the form of a cord usually made from paper, or the like, about which is loosely positioned a tubular cover 24 preferably made of a soft material such as rubber. The tubular cover is split longitudinally as at 26 to permit the insertion of the core 22. Surrounding the cover 24 I have provided a fabric covering 28, the free edges of which are stitched as at 30, forming the attaching portion 16 and securing the parts together in a unitary structure.

Heretofore the parts thus far described have been extensively used, but they have not fully answered the purpose for which they have been intended because they do not possess sufficient resiliency or rigidity to firmly hold the cushioning portion 14 tightly against the movable part of the door or window opening.

In order to give the parts more rigidity and at the same time provide sufficient flexibility, I have preformed a wire into loops so that it may have a portion coiled about the core 22 and another portion extending laterally into the attaching portion 16. It is important to select a wire having a deflection characteristic which, when bent within limits, is elastic but when bent beyond its limits takes a base set and is elastic from that bent position. This is important when the weatherstrip is applied to an irregular surface. For example, the strip may be manually bent beyond its elastic limit to fit an irregular surface but when so bent it is elastic from that bent position. I have found that a wire suitable for this purpose should have an elastic limit between 250,000 lbs. per square inch and 350,000 lbs. per square inch and may be formed from what is commonly termed music wire, having a diameter of approximately one sixty-fourth of an inch.

As shown in Figs. 2 and 3 the wire is looped into a zigzag form, one side of which is formed with loops 32 encircling the core 22 and at the other side the loops lie in substantially a flat plane, as at 34, the portions 34 extending laterally through the slot 26. In this form of my invention the slot is formed tortuous, having longitudinally extending portions 36 and transverse portions 38. Longitudinally extending slots 40 intersect the transverse portions 38 to provide openings for the reception of the portion 34 of the wire so that when the wire is assembled in the tubular member the wire forms an interlocking connection between the sides of the tubular member. As these parts are assembled the fabric cover 28 is applied and stitched along the laterally extending portions 34 of the wire. Forming the wire into zigzag shape makes it readily possible to bend the weatherstrip in any direction such as is required in securing the strip to a curved surface or in going around a corner of the door opening, or the like.

Although but several specific embodiments of the invention have herein been shown and described, it will be understood that various changes in the size, shape and arrangement of parts may be made without departing from the spirit of my invention.

What is claimed is:

1. A weatherstrip comprising an elongated core of yielding material, a resilient wire having portions encircling said core alternating with laterally extending loops all of which are on the same side of said core, and a tubular resilient member surrounding said core and the wire portions encircling said core, said tubular member having a tortuous slot extending generally in a longitudinal direction for receiving the laterally extending loops of said wire, said loops forming an interlocking connection between the adjacent edges of the slot when in assembled position.

2. A weatherstrip comprising an elongated core of yielding material, a resilient loop of wire having a portion of each loop around said core and a portion of each loop projecting laterally therefrom, a tubular member surrounding said core, said tube being slotted longitudinally and being further provided with recesses adjacent the slot for receiving the laterally extending portions of the wire loops, said wire loops forming an interlock between the adjacent faces of the edges formed by the slot.

CLARK A. TEA.